United States Patent [19]

Weidman

[11] Patent Number: 5,664,037
[45] Date of Patent: Sep. 2, 1997

[54] MULTI-NECKDOWN FIBER OPTIC COUPLER

[75] Inventor: David L. Weidman, Corning, N.Y.

[73] Assignee: Corning Incorporated, Corning, N.Y.

[21] Appl. No.: 565,542

[22] Filed: Nov. 30, 1995

Related U.S. Application Data

[60] Provisional application No. 60/004,646, Sep. 29, 1995.
[51] Int. Cl.$^6$ .................................................. G02B 6/26
[52] U.S. Cl. ............................... 385/46; 385/43; 385/50
[58] Field of Search ................................. 385/46, 43, 50, 385/51, 27, 1, 42

[56] References Cited

U.S. PATENT DOCUMENTS 5,268,979 12/1993 Weidman .............................. 385/42
5,295,205 3/1994 Miller et al. .......................... 385/43 X Primary Examiner—Phan T. H. Palmer
Attorney, Agent, or Firm—William J. Simmons, Jr.

[57] ABSTRACT

A unitary fiber optic coupling device in which N fibers (N≥3) extend in a parallel array having two coupling regions of reduced cross-sectional area. At least one of the fibers is formed of two sections that are situated end-to-end, an active core-containing fiber section that is situated in the first coupling region and a dummy fiber section that is situated in the second coupling region. The coupler also contains at least second and third fibers that are active core-containing fibers throughout their lengths. The second and third fibers couple to one another in the first coupling region but remain uncoupled to one another in the second coupling region. This configuration enables a unitary coupling device to posess multifunction capability. Two fibers that couple in the first coupling region do not couple in the second coupling region, thus avoiding resonance effects.

17 Claims, 7 Drawing Sheets

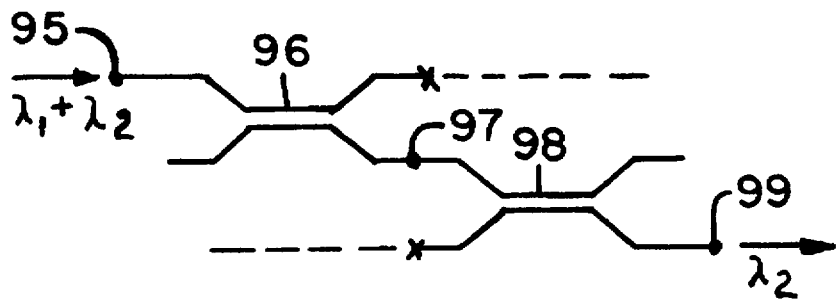
Fig. 13
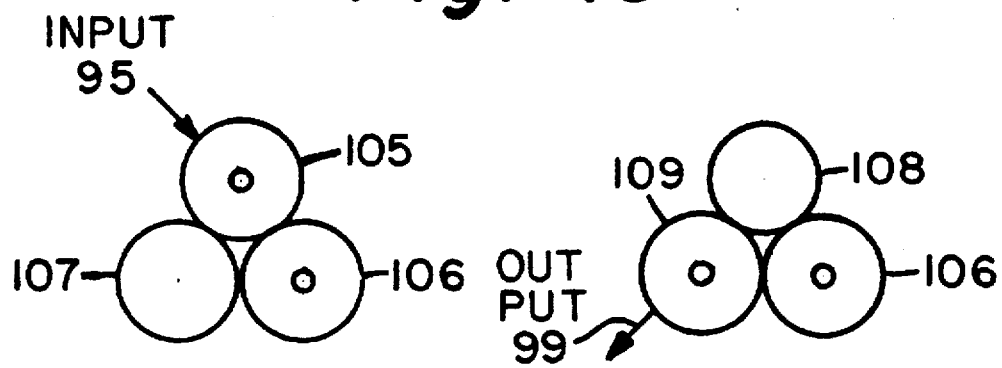
Fig. 14        Fig. 15
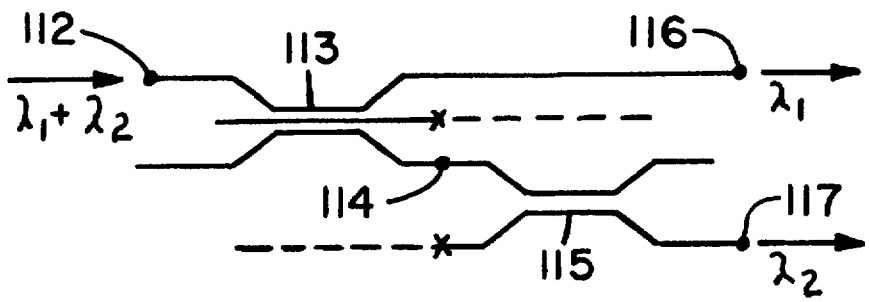
Fig. 16
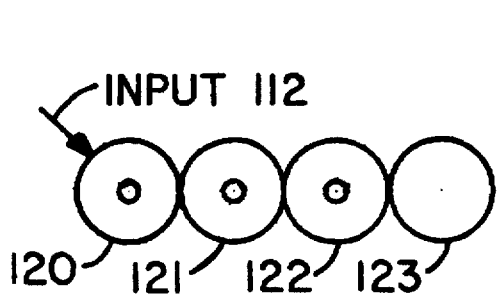  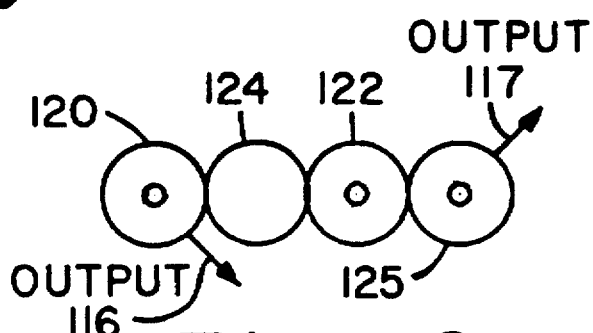
Fig. 17        Fig. 18

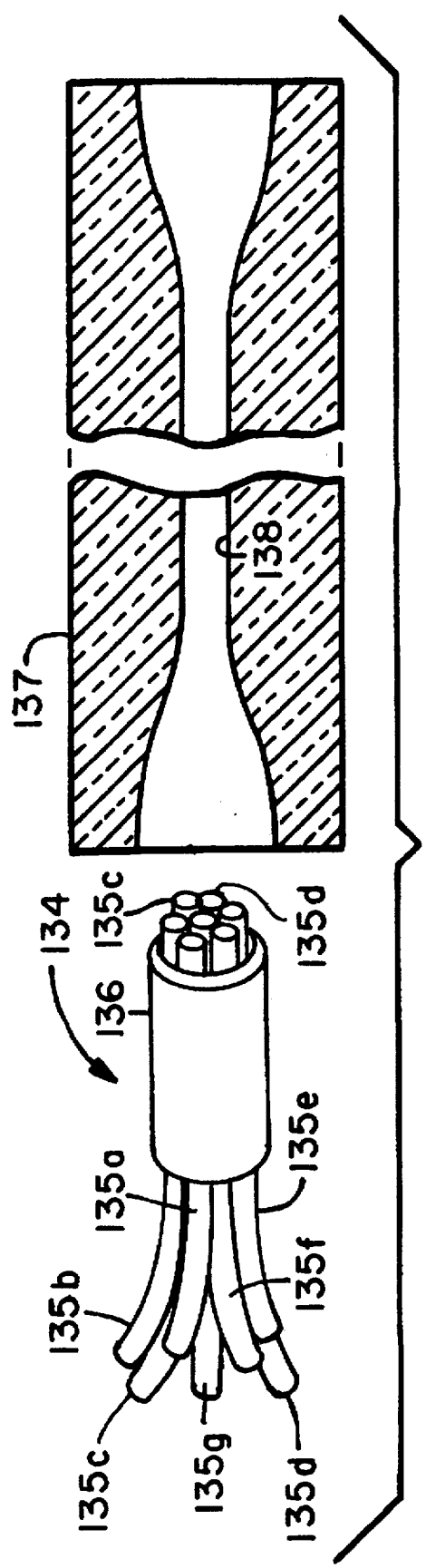
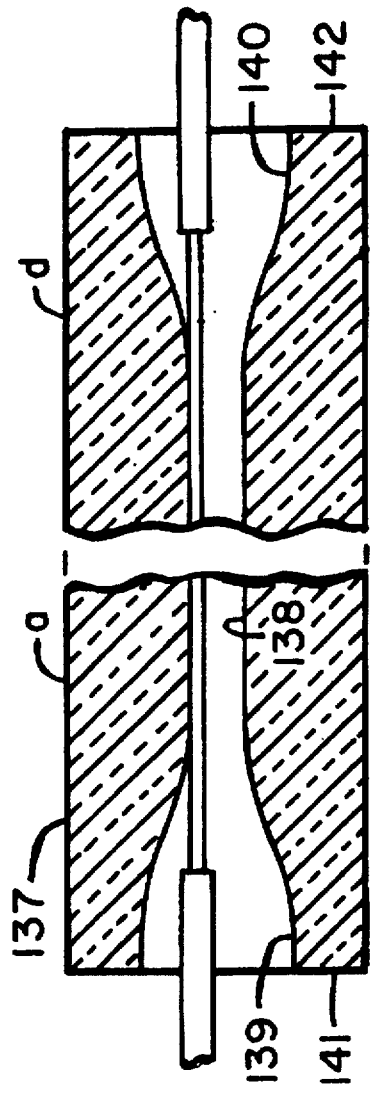
Fig. 19
Fig. 20

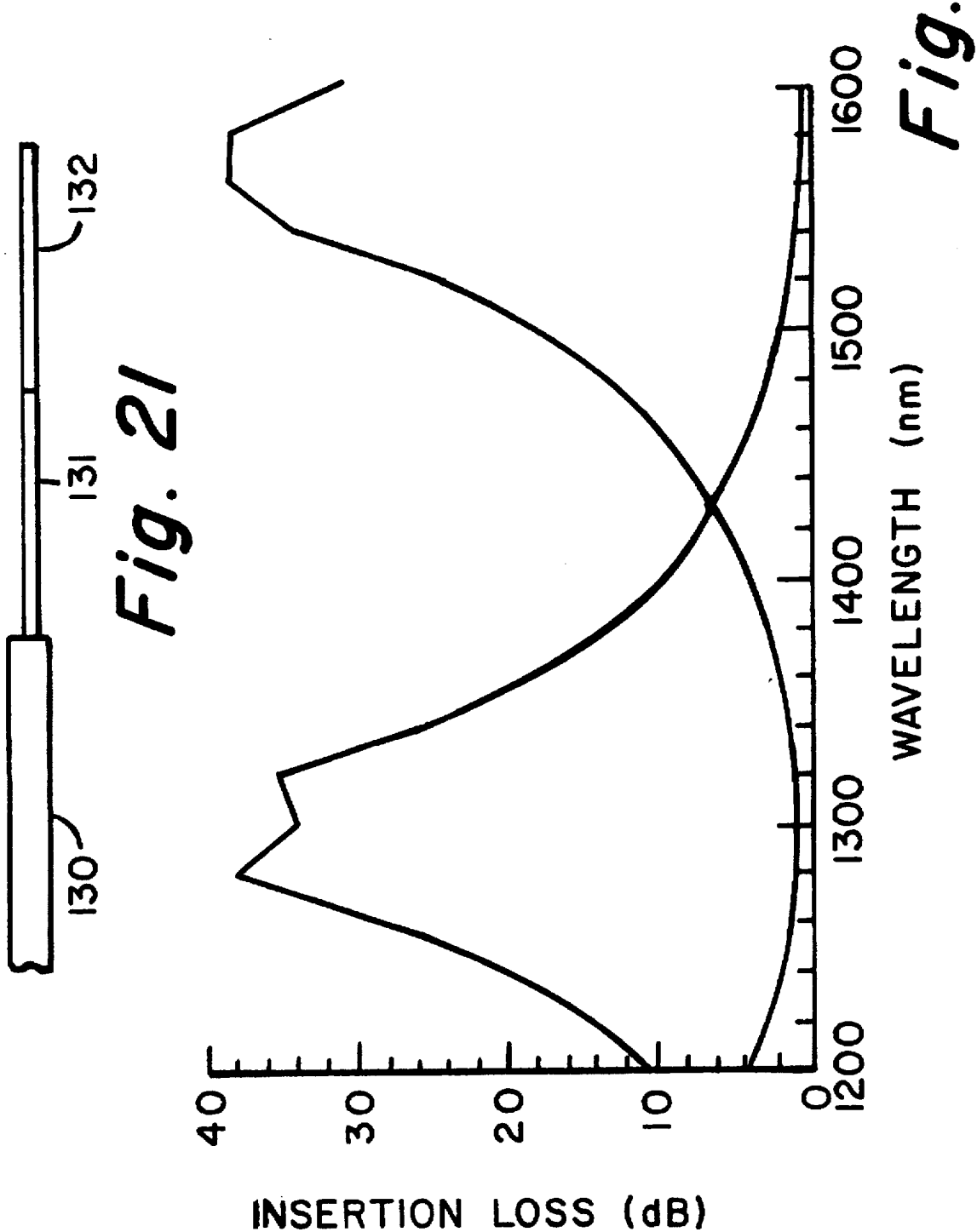

MULTI-NECKDOWN FIBER OPTIC COUPLER

This application claims priority of U.S. Provisional Application Ser. No. 60/004,646 filed Sep. 29, 1995.

BACKGROUND OF THE INVENTION

The present invention relates to multifunction fiber optic couplers.

Single-mode fiber optic couplers are useful as signal combiners and distributors in multiple terminal systems such as those for bringing wideband services to consumers. Some of these systems need high resolution wavelength division multiplexer (WDM) couplers. A multicoupler system that is used in fiber amplifiers taps off a small percentage of the input signal for monitoring purposes and couples the remainder of the signal along with the pump power to the amplifying fiber. There are many other uses for multicoupler systems.

Fiber optic couplers can be made by drawing and fusing two or more single-mode optical fibers to form a biconical taper structure. The application of heat and tensile load causes the necking down of each fiber into a biconically-tapered section which fuses together with similar sections of adjacent fibers since the fibers are softened.

Various coupler properties can be improved by inserting the fibers into a glass tube prior to heating and stretching the fibers, thereby resulting in the formation of an "overclad coupler". The process involves inserting the fibers into a glass tube, evacuating the tube, and heating a region of the tube to cause it to collapse onto the fibers. The refractive index of the glass tube is lower than or equal to that of the claddings of the fibers. The central portion of the collapsed region is drawn down to that diameter and coupling length which is necessary to obtain the desired coupling properties.

The aforementioned multifunction and other coupler systems can be formed by connecting together two or more simple couplers by sections of optical fiber. However, such coupler systems are relatively expensive and can have reliability problems. Also, these systems are cumbersome and, because of their interconnecting fibers, occupy an inordinate amount of space. Systems installers would therefore prefer to handle unitary coupler devices which include multiple couplers and which perform multiple functions.

While planar technologies can be employed to produce multi-coupler systems, small port count devices have little margin for loss, and planar manufacturers have difficulty meeting the optical requirements in a commercially viable way. The present invention can be employed to produce these small port count devices very cost effectively as compared to planar fabrication techniques. In accordance with this invention, these disadvantages are overcome by employing unitary fiber-type coupler devices. In addition, monolithic coupler technology can be used to form environmentally stable multifunction coupler systems.

One particular multifunction coupler for which there is a present need functions as a combination signal combiner and signal splitter. For example, a 2×4 coupler combines two signals and splits the combined signals equally into four output signals. Attempts have been made to form an achromatic 2×4 coupler by the aforementioned overclad technique, whereby optical fibers are inserted into a glass tube that is collapsed onto the fibers and stretched to form a single coupling region of reduced diameter. The resultant devices have not shown the required degree of achromaticity.

The device of the present invention accomplishes the achromatic 2×4 coupling function in a unitary coupler device having two concatenated coupling regions. The unique design of this unitary coupler is such that two fibers that couple in the first coupling region do not couple in the second coupling region, thus avoiding that interference effect that would result in a variation in output power as a function of wavelength. This feature of the invention also enables the fabrication of coupler devices that perform other functions.

It is an object of the present invention to provide an improved fiber optic coupler that will overcome the heretofore noted disadvantages of prior art coupler devices and systems. Another object is to provide a unitary fiber-type concatenated coupler device that has two or more tapered coupling regions and that is so constructed that there is no resonance caused by two fibers coupling to each other in two coupling regions. A further object is to provide a monolithic fiber-type device that performs a plurality of functions.

As used herein, the term "active fiber" means an optical fiber having a core and cladding; such a fiber is capable of efficiently propagating light. Active fibers are contrasted with "dummy" fibers that do not contain cores.

SUMMARY OF THE INVENTION

Briefly, the present invention relates to a method of forming a fiber optic coupling device comprising a N fibers extending in a parallel array, wherein $N \geq 3$. Situated along the length of the array are at least two coupling regions where the cross-sectional area of the fibers is smaller than the cross-sectional area of the fibers at the first and second ends of the array. The N fibers and the coupling regions are formed such that light which had been propagating in one of the fibers into a first coupling region and has separated in the first coupling region so that it propagates in at least two of the fibers from the first coupling region into a second coupling region, does not interfere in the second coupling region.

In one embodiment, at least one of the fibers of the array is formed of an active fiber section and a dummy fiber section situated end-to-end. The active fiber section has a light transmitting core surrounded by a cladding having a refractive index lower than that of said core, whereas the dummy fiber section has no light transmitting core.

In accordance with another aspect of the invention, one of the coupling regions has a three-fiber coupling array wherein light is coupled from a first of the plurality of fibers, through a second of the plurality of fibers to a third of the plurality of fibers.

BRIEF DESCRIPTION OF THE DRAWINGS

FIG. 13 is a schematic diagram of a three-fiber, two taper filter.

FIGS. 14 and 15 schematically illustrate the arrangement of fibers in the first and second coupling regions of a unitary coupler to provide the function of the circuit of FIG. 13.

FIG. 16 is a schematic diagram of a four-fiber, two taper WDM coupler system.

FIGS. 17 and 18 schematically illustrate the arrangement of fibers in the first and second coupling regions of a unitary coupler to provide the function of the circuit of FIG. 16.

FIG. 19 is a partial cross-sectional view illustrating a fiber insertion apparatus.

FIG. 20 is a cross-sectional view illustrating the positioning of a fiber in a coupler tube.

FIG. 21 illustrates the fusion of two fiber sections to form a composite fiber.

FIG. 22 is a plot of insertion loss vs. wavelength for the WDM coupler of Example 1.

DESCRIPTION OF THE PREFERRED EMBODIMENTS

This invention pertains to unitary fiber-type coupler devices that perform multiple coupler functions. A unitary coupler device is one in which an array of N parallel optical fibers is provided with M tapered regions in which coupling can occur between fibers in the array, wherein N≧3 and M≧2; each of the N fibers is situated in an identical array in each of the M tapered regions. In a preferred embodiment the N fibers are located in an elongated body of matrix glass to form a compact, environmentally rugged monolithic device.

Figure 1:
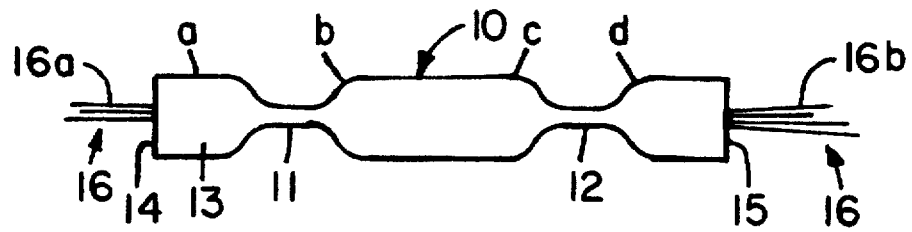
FIG. 1 is a side elevational view of a fiber-type concatenated coupler device.

The device 10 of FIG. 1, which is exemplary of unitary multifunction coupler devices of the monolithic type, is formed of an elongated body 13 of matrix glass. A plurality of fibers 16 extend through body 13, which includes two tapered regions 11 and 12. Device 10 is formed by inserting fibers 16 into the bore of a glass capillary tube, and heating and evacuating the tube to collapse it onto the fibers. The tube could be collapsed over the entire region between points a and d, or alternatively, it could be collapsed onto the fibers only in those regions that are to be tapered to form couplers, i.e. between points a and b and between points c and d. The tube is again heated between points a and b, and it is drawn down to that diameter and coupling length which is necessary to obtain the desired coupling properties. Thereafter, the heating and stretching step is sequentially performed between points c and d, and at any other region of the tube that is to be provided with a neckdown region to induce coupling between fibers.

A unitary fused fiber coupler could be made by arranging N fibers in the appropriate array, fusing and stretching the fibers in a first tapered region, and then fusing and stretching the fibers in a second tapered region. At least the coupling regions of the resulting device would be placed in a protective potting material or housing.

In both the overclad and fused fiber embodiments, the devices can be made in relatively short lengths. A device having N tapers or coupling regions can be made as short as N×1.2+4.0 cm. The length of a two taper device would be 6.4 cm.

The broad applicability of this invention will become apparent from the following description of various circuits that can be implemented by application of the principles of the invention to various multicoupler functions.

Figure 2:
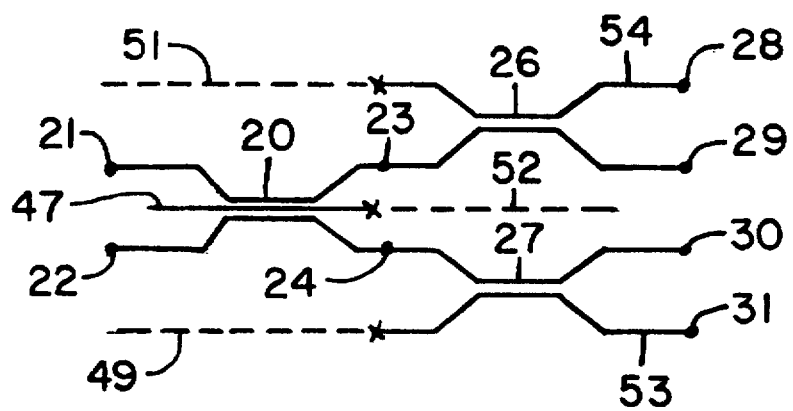
FIG. 2 is a schematic diagram of a seven-fiber 2×4 coupler system.

FIG. 2 is a schematic circuit diagram of an achromatic 2×4 splitter. The first region is a 2×2 three-fiber coupler 20 which splits incoming light on either of the inputs 21 and 22 equally between the two outputs 23 and 24. The second tapered region consists of two 1×2 couplers 26 and 27 to divide the light further. The output signal at terminal 23 is input to coupler 26, and the output signal at terminal 24 is input to coupler 27. An input signal applied to terminal 21 or 22 is equally divided between output terminals 28, 29, 30 and 31.

The dashed lines in FIG. 2 represent dummy fiber sections that abut or are fused to active optical fibers at the x's. Dummy fiber section 52 is a continuation of active fiber 47 which forms part of three-fiber coupler 20. Dummy fiber sections 49 and 51 are continuations of active fibers that form part of two-fiber couplers 27 and 26, respectively. To form the device of FIG. 2, there are two further fibers that are not shown in that figure; those fibers comprise dummy fibers that extend through both the tapered region that forms coupler 20 and the tapered region that forms couplers 26 and 27. These dummy fibers are discussed in conjunction with the description of FIGS. 5 and 6.

In accordance with the present invention, all of the fibers of the multifiber coupling device are located in each of the coupling regions. In the device of FIG. 2, couplers 26 and 27 are both located in the second coupling region. If the fibers of coupler 26 interchange power with the fibers of coupler 27, undesirable interference effects will occur as light from a particular input to the first coupler 20, which was split there, is recombined in the second coupling region (couplers 26 and 27). The resultant interference effects would be similar to those that occur in Mach-Zehnder devices. If such interference effects occur, the output power will vary as a function of wavelength. Such undesirable interaction must be avoided when implementing the design of FIG. 2 into an achromatic unitary device such as the monolithic device shown in FIG. 1.

Figure 3:
FIG. 3 is a cross-sectional view of a multi-section optical fiber having a low reflection termination.
Figure 4:
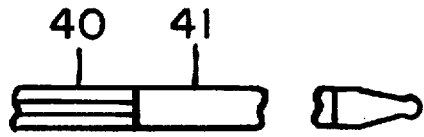
FIG. 4 is a cross-sectional view of a multi-section optical fiber formed by splicing two fiber sections.

To achieve the desired performance, a 7-fiber geometry is used to implement the above-described 2×4 function. However, three of the seven fibers are discontinuous between tapers 11 and 12, these fibers changing between a light-carrying fiber and a coreless dummy fiber. Such a discontinuous fiber can consist of a composite fiber of the type illustrated in FIG. 3 or FIG. 4, for example. The active fiber 34 may be terminated with a low-reflection termination 35 as shown in of FIG. 3. The dummy fibers would merely need to be cleaved, as reflections back from them should be minimal, although they could also be terminated with a low reflection termination. FIG. 4 shows that the active fiber 40 and the dummy fiber 41 can be spliced together in the region between points b and c. Reflections from the splice of FIG. 4 are extremely low, and the far end of the dummy fiber section might be either cleaved or provided with a low reflection termination as shown in FIG. 4. The junction between the two fiber sections is situated in that portion of device 10 between points b and c.

Figure 5:
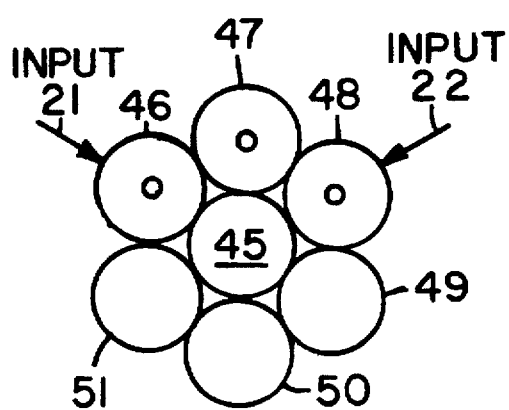
FIGS. 5 and 6 schematically illustrate the arrangement of fibers in the first and second coupling regions, respectively, of FIG. 1 to provide the functions of the circuits of FIGS. 2 and 9.
Figure 6:
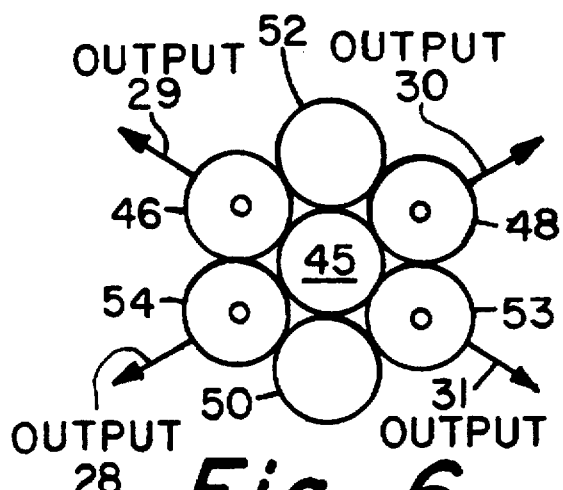

In a 2×4 coupler of the type illustrated in FIG. 2, the fiber sections in tapered regions 11 and 12 are arranged as shown in FIGS. 5 and 6, respectively. In both tapered regions the fibers are arranged in a seven fiber close packed array in which six fibers are arranged around a central dummy fiber 45 and all fibers have the same diameter. In taper 11, the two input signals are applied to identical fibers 46 and 48 of the 3-fiber linear coupler that also includes fiber 47. There is a propagation constant difference $\delta\beta$ between fiber 47 and each of the fibers 46 and 48. Referring back to FIG. 2, the value of $\delta\beta$ is chosen so that at a particular coupling length, power input into fiber 21 is equally split between outputs 23 and 24. Substantially no power remains in fiber 47 of FIG. 5. Coupler 20 is symmetric in that power input into fiber 22 is also split equally between fibers 23 and 24.

Figure 7:
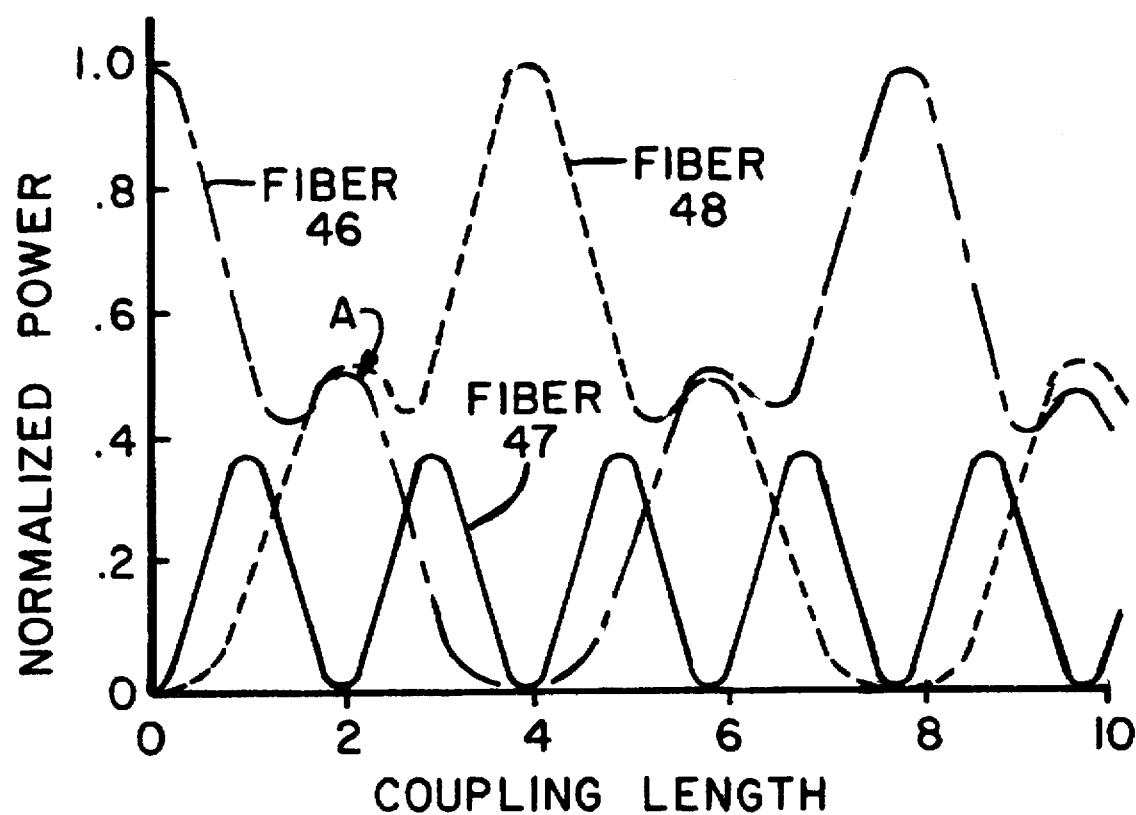
FIG. 7 is a graph of normalized coupling power as a function of coupling length for the three-fiber linear coupler 20 of FIG. 2 (fibers 46, 47 and 48 of FIG. 5).

FIG. 7 shows the results of a model calculation of coupler 20. The three curves indicate the manner in which the power propagating in each of fibers 46, 47 and 48 varies as a function of coupling length. Arrow A indicates the position where half of the power input to fiber 46 couples to fiber 48 and half of the input power remains in fiber 46, whereas none of the input power remains in fiber 47. Because the slope of the power curves for the fibers 46 and 48 in region b of FIG. 1 (outputs 23 and 24 of FIG. 2) is zero at that location, achromatic behavior should be observed. For this particular model calculation, done for a parallel-core coupler in Mathematica using standard mode-coupling equations, $(\beta_{47}-\beta_{46})/C=1.62$ and $\beta_{48}=\beta_{46}$, where the $\beta$'s are the propagation constants of the respective fibers and C is the near-neighbor coupling constant, and non-near-neighbor coupling is assumed to be zero.

Between the tapers, fiber sections 47, 49, and 51 are terminated or spliced, as indicated above, whereby, somewhere in the region between points b and c of FIG. 1, active fiber section 47 abuts or is spliced to dummy fiber 52, and dummy fiber sections 49 and 51 are terminated or spliced to active fiber sections 53 and 54, respectively. Active fibers 46 and 48 are continuous throughout the entire monolithic device; they are the inputs to the two optically separated 1×2 couplers 26 and 27 (FIG. 2) of tapered region 12 (FIG. 1). Couplers 26 and 27 are of the standard 2-fiber, 3 dB, $\delta\beta$ achromatic design. There is a $\delta\beta$ between fibers 46 and 54 which is the same as the $\delta\beta$ between fibers 48 and 53. Thus, the outputs on fibers 46, 48, 53 and 54 (outputs 29, 30, 31 and 28 of FIG. 2) are achromatic. Fiber 50 and the central fiber 45 are continuous dummy fibers.

Figure 9:
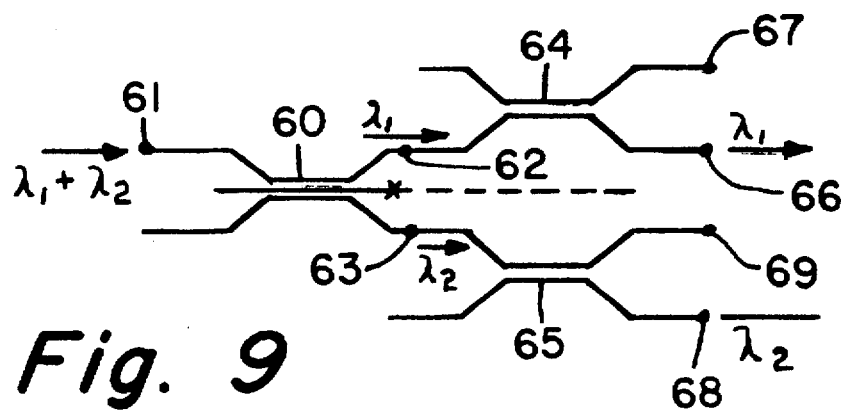
FIG. 9 is a schematic diagram of a seven-fiber high-isolation WDM coupler system.

FIG. 9 shows a high-isolation wavelength division multiplexer (WDM) coupler system. This device can be formed as a 2-taper monolithic structure of the type shown in FIG. 1. Three-fiber coupler 60 is situated in the first taper region 11 and two-fiber couplers 64 and 65 are situated in the second taper region 12. The arrangement of active and dummy fibers in the two coupler regions is the same as those arrangements which are illustrated in FIGS. 5 and 6. The device differs from the 2×4 coupler described above in that the first and second tapered regions 11 and 12 are drawn to a length sufficient to cause light at a first wavelength $\lambda_1$ to be coupled to one output fiber while light of a second wavelength $\lambda_2$ is coupled to the other output fiber, the device forming a wavelength demultiplexer. Referring to FIG. 9, light at wavelengths $\lambda_1$ and $\lambda_2$ is coupled to the input terminal 61 of coupler 60. Light at $\lambda_1$ appears at terminal 62 while light at wavelength $\lambda_2$ appears at terminal 63. Couplers 64 and 65 are identical in function to coupler 60. The light at wavelength $\lambda_1$ input to coupler 64 appears at output terminal 66. A small reminant of the light at wavelength $\lambda_2$ that is applied to terminal 61 appears at terminal 62. Most of this unwanted light is coupled by coupler 64 to output terminal 67. Similarly, light at wavelength $\lambda_2$ couples in coupler 65 and appears at output terminal 68. Most of the unwanted light at wavelength $\lambda_1$ which appears at terminal 63 remains uncoupled in coupler 65 and appears at output terminal 69.

The coupler system of FIG. 9 could be used to separate light at a wavelength of 1550 nm from light at a wavelength of 1310 nm, for example. If light at these two wavelengths was applied to terminal 61, the 1550 nm wavelength light would appear at terminal 68; the amount of 1310 nm wavelength light appearing at terminal 68 would be down about −40 dB. Similarly, most of the 1310 nm wavelength light appearing at input terminal 61 would be coupled to output terminal 66, and the amount of the 1550 nm light in the 1310 mm path at terminal 66 would be down about −40 dB.

Figure 10:
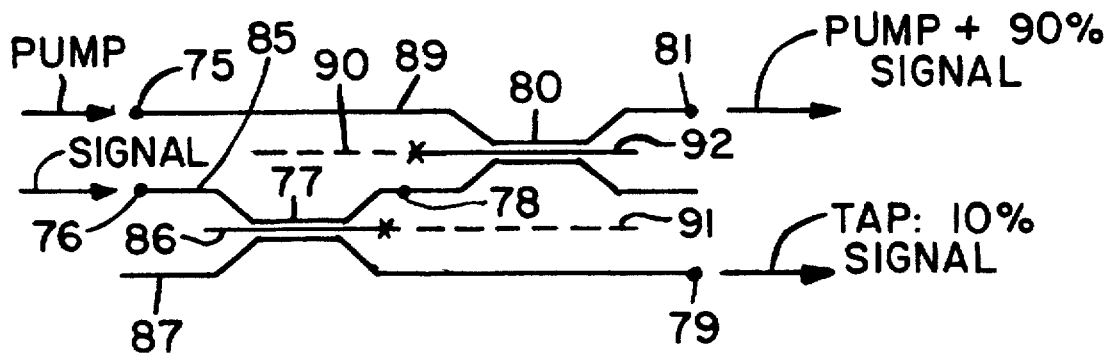
FIG. 10 is a schematic diagram of a WDM coupler plus a tap.

FIG. 10 shows a multifunction coupler system that functions as a WDM and a tap for a fiber amplifier. This coupler system can be formed as a 2-taper monolithic coupler of the type shown in FIG. 1. Coupler 77 is in the first taper region 11, and coupler 80 is in the second taper region 12. The pump signal applied to input terminal 75 is directly applied to coupler 80. Ten percent of the signal applied to terminal 76 is coupled by coupler 77 to output terminal 79. The remaining 90% of the signal appears at output terminal 78 of coupler 77 and is applied to coupler 80. The signal wavelength is coupled by coupler 80, but the pump wavelength remains uncoupled, whereby the pump plus 90% of the signal appears at output terminal 81. The tap output at terminal 79 can be used for monitoring purposes, and the output at terminal 81 can be coupled to a fiber amplifier.

Figure 11:
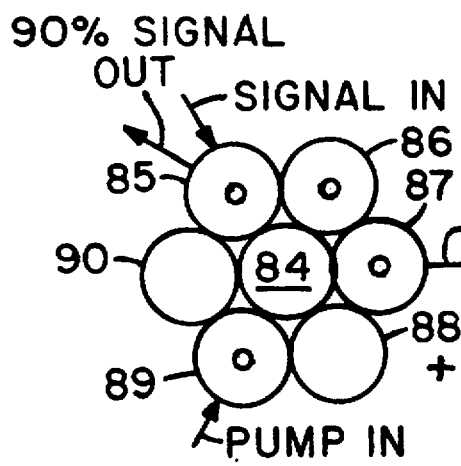
FIGS. 11 and 12 schematically illustrate the arrangement of fibers in the first and second coupling regions, respectively, of FIG. 1 to provide the function of the circuit of FIG. 10.
Figure 12:
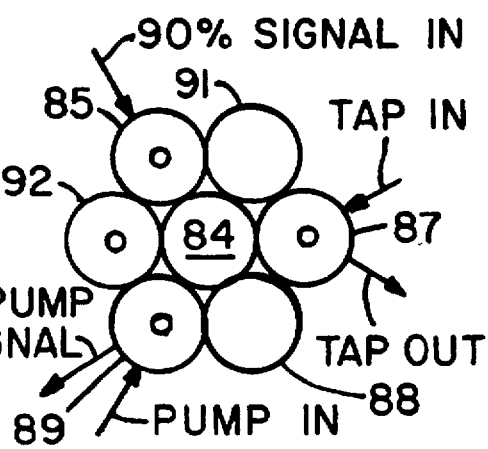

For a WDM plus tap coupler system, the fiber sections in tapered region 11 of FIG. 1 are arranged as shown in FIG. 11, and the fiber sections in tapered region 12 are arranged as shown in FIG. 12. In both tapered regions the fibers are arranged in a 7 fiber close packed array in which six fibers are arranged around a central dummy fiber 84 and all fibers have the same diameter.

In taper 11, the pump power is applied to fiber 89 where it propagates uncoupled until it reaches taper 12. The signal power is applied to fiber 85 of the 3-fiber linear coupler that also includes fibers 86 and 87. There is a propagation constant difference $\delta\beta$ between fiber 86 and each of the fibers 85 and 87. Referring back to FIG. 10, the value of $\delta\beta$ is chosen so that at a particular coupling length, signal power applied to input terminal 76 is split such that 10% of it couples to output 79 and 90% remains uncoupled. The value of $\delta\beta$ is chosen so that substantially no power remains in fiber 86 of FIG. 11.

Somewhere in the region between points b and c of FIG. 1, active fiber section 86 abuts or is spliced to dummy fiber section 91, and dummy fiber section 90 abuts or is spliced to active fiber section 92. Active fibers 85, 87 and 89 are continuous throughout the entire unitary device. Fiber 88 and central fiber 84 are continuous dummy fibers. Fibers 87 and 89 provide the two outputs from taper 12 (outputs 79 and 81, respectively, of FIG. 10.)

At the input end of taper 12 (region c of FIG. 1), fiber 85 is the input fiber of the 3-fiber linear coupler which also includes fiber section 92 and fiber 89. There is a propagation constant difference $\delta\beta$ between fiber section 92 and each of the fibers 85 and 89. Referring back to FIG. 10, the value of δβ is chosen so that at a particular coupling length, the pump wavelength couples from input terminal 75 to output fiber 81 of coupler 80, and the signal wavelength couples from terminal 78 to output fiber 81. Substantially no power remains in fiber 92 of FIG. 12.

Figure 8:
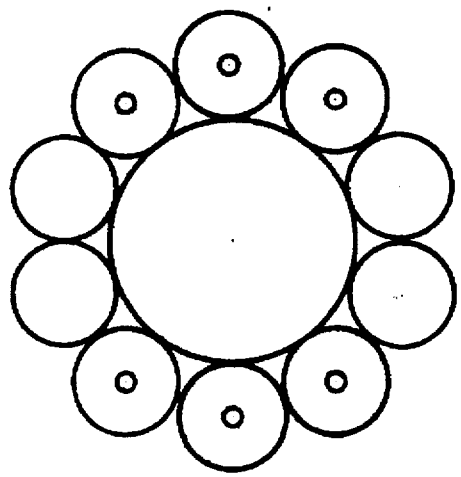
FIG. 8 illustrates a fiber array of ten fibers around one central fiber.

The unitary concatenated coupler technique is also applicable to devices having total fiber counts other than those discussed above. FIG. 8 illustrates that a larger number of fibers can be accomodated by increasing the size of the central fiber with respect to the remaining fibers. The variables that can be manipulated to control the device function are the number of tapered coupling regions and the type of fiber sections (active or dummy) that are employed in each coupling region.

FIG. 13 shows a high-isolation concatenated filter which can be formed as a three-fiber, two-taper device. Two-fiber coupler 96 is situated in the first taper region, and two-fiber coupler 98 is situated in the second taper region. Light at wavelengths $\lambda_1$ and $\lambda_2$ is applied to the input terminal 95 of coupler 96. The first and second tapered regions are drawn to a length sufficient to cause light at wavelength $\lambda_1$ to couple to the through fiber while light at wavelength $\lambda_2$ couples to the second fiber and appears at terminal 97. Only a remnant of light at wavelength $\lambda_1$ couples to terminal 97. Coupler 98 is identical in function to coupler 96; thus, light at wavelength $\lambda_2$ couples in coupler 98 and appears at output terminal 99. Most of the unwanted light at wavelength $\lambda_1$ which appears at terminal 97 couples to the through fiber in coupler 98.

The arrangement of active and dummy fibers in the first and second coupler regions is illustrated in FIGS. 14 and 15, respectively. In both tapered regions the fibers are arranged in a three-fiber close packed array. In the first taper, the input signal is applied to fiber section 105 which is part of a coupler that also includes fiber 106; power at wavelength δβ couples from fiber section 95 to fiber 106. The second taper is identical to the first taper, whereby the power at wavelength δβ couples in the second taper from fiber 106 to fiber section 109. Whereas fiber 106 is continuous throughout the unitary coupler device, the other two fibers are formed of two sections, one section being an active fiber and the other section being a dummy fiber. Since fiber section 105 does not continue into the second coupler region, and since fiber Section 109 does not continue into the first coupler region, no pair of fibers couples in both coupler regions; thus the above-described resonance effect is avoided.

FIG. 16 shows a WDM coupler having one high-isolation output terminal; this unitary device is configured as a concatenated two-taper four-fiber device. Three-fiber coupler 113 is situated in the first taper region, and two-fiber coupler 115 is situated in the second taper region. Light at wavelengths $\lambda_1$ and $\lambda_2$ is applied to the input terminal 112 of coupler 113. The first and second tapered regions are drawn to a length sufficient to cause essentially all of the light at a first wavelength $\lambda_1$ to couple to the through fiber and appear at terminal 116; only a remnant of that light is coupled to terminal 114. Light at wavelength $\lambda_2$ couples to the second coupler fiber and appears at terminal 114. Light at wavelength $\lambda_2$ couples in coupler 115 and appears at output terminal 117. Most of the unwanted light at wavelength $\lambda_1$ which appears at terminal 114 couples to the through fiber in coupler 115.

The arrangement of active and dummy fibers in the first and second coupler regions is illustrated in FIGS. 17 and 18, respectively. In both tapered regions the fibers are arranged in a four-fiber linear array. In the first taper, the input signal is applied to fiber 120 which is part of a three-fiber linear coupler that also includes fiber section 121 and fiber 122. There is a propagation constant difference δβ between fiber section 121 and each of the fibers 120 and 122. The value of δβ is chosen so that at a particular coupling length, power at wavelength $\lambda_1$ that is input into fiber 120 remains in that fiber, while power at wavelength $\lambda_2$ is coupled. Substantially no power remains in fiber section 121. In the two-fiber coupler of the second taper, coupler function is identical to that of coupler 113 in that power at wavelength $\lambda_2$ coupled in the from fiber 122 to fiber section 125. Whereas fibers 120 and 122 are continuous throughout the unitary coupler device, the other two fibers are formed of two sections, one section being an active fiber and the other section being a dummy fiber. Since fiber section 121 does not continue into the second coupler region, and since fiber section 125 does not continue into the first coupler region, no pair of adjacent fibers couples in both coupler regions.

The following specific examples concern methods of making (1) a WDM coupler of the type discussed in connection with FIGS. 9, 5 and 6 and (2) an achromatic 2×4 splitter of the type discussed in connection with FIGS. 2, 5 and 6. FIGS. 19–24 will also be discussed in connection with these examples.

The diameters of all of the fibers used in these examples was 125 μm; they were provided with 250 μm diameter urethane acyrlate coatings. The active fibers are made by techniques that are disclosed in U.S. Pat. No. 5,011,251 which is incorporated herein by reference. Some of the active fibers, which are referred to herein as standard fibers, include an 8 μm diameter core of $SiO_2$ doped with 8.5 wt. % $GeO_2$ and a $SiO_2$ cladding that contains about 0.05 wt. % chlorine as a residual from the drying process. Active fibers referred to herein as modified active fibers are similar to the standard fibers except that the claddings contain about 0.11 wt. % chlorine or about 0.19 wt % chlorine. The dummy fibers consisted of $SiO_2$ doped with 2.0 wt % $B_2O_3$.

The glass tubes for both examples were 40 mm long, had an outside diameter of 2.6 mm, and had a bore diameter of 380 μm. The composition of the inner 30% of the tube radius was $SiO_2$ doped with 2 wt. % $B_2O_3$, and the composition of the remainder of the tube radius was $SiO_2$ doped with 8 wt. % $B_2O_3$. The ends of the tube bores are provided with funnels as shown in FIGS. 19 and 20.

The fibers are inserted into the tube in the manner described below to form a coupler preform. The ends of the coupler preform are inserted into chucks that are mounted on computer controlled stages of a draw apparatus that is capable of stretching the coupler preform longitudinally. Vacuum attachments are affixed to both ends of the tube to evacuate the bore. A vacuum of 7 inches of mercury was employed. A ring burner surrounds the tube.

A first tapered coupling region 11 is formed at that portion of the tube between points a and b (FIG. 1) by evacuating the tube and heating that portion to collapse it onto the fibers, and then moving the chucks so that those sections of the tube on opposite sides of the hot zone are moved away from each other to stretch the heated region. The stretching operation is stopped after the tube was lengthened a predetermined distance. The first stage coupler was measured after its fabrication (before the second stage couplers were fabricated). The first stage coupler was monitored at outputs 29 and 30 of FIG. 2.

A second tapered coupling region 12 is then formed at that portion of the tube between points c and d by subjecting the appropriate region of the tube to stretching conditions that are similar to those used to form the first coupling region except that the stretching distance is such that the desired coupling is achieved between the fibers in the second coupling region.

EXAMPLE 1

The WDM coupler of this example consists of three concatenated 1310 nm/1550 nm WDM multiplexer couplers. The first stage is a 3-fiber type WDM coupler and the second stage consists of two 2-fiber WDM couplers. During the fabrication of the device, the four outputs 66, 67, 68 and 69 were monitored during the stretching operations that formed the first and second stage couplers to get diagnostic information on those couplers.

A fixture 134 was employed to insert the fibers into bore 138 of tube 137. Fixture 134 consists of an array of seven stainless steel tubes 135a–135g in a six-around-one configuration at the point nearest tube 137. This is done by arranging them inside a still-larger stainless steel tube 136 of an appropriate inside diameter (three times the outside diameter of the smaller tubes) to hold them in that pattern. Away from the coupler, the tubes are flared apart to facilitate fiber insertion.

Tube 137 is inserted into a clamp (not shown) which holds it colinearly with fixture 134. Only standard active fibers and dummy fibers were used in this example. The fiber stuffing procedure was carried out as follows.

1. Referring to FIGS. 5 and 6, the two through active fibers 46 and 48 (each about 2 meters long) were stripped at their midregions so that the length of the bare fiber was equal to the distance between the midpoints of funnels 139 and 140.
2. These two fibers were then threaded through tubes 135a and 135c. First, one was threaded through the alignment fixture and into the tube bore 138 so that the coated portions of the fiber end midway along the longitudinal length of its respective funnel as shown in FIG. 20. Then the other through fiber was inserted through the alignment fixture, past the other fiber, and it was also centered.
3. Fibers 49/53 and 51/54 of FIGS. 5 and 6 were fabricated as shown in FIG. 21. Coating 130 was removed from the end of about 1 meter of active fiber 131 so that the length of stripped portion of fiber 131 was about equal to ½ the length of tube 137. A piece of coreless fiber 132 about equal in length to the stripped section of fiber 131 was fused to the end of bare fiber 131.
4. These fibers were inserted through tubes 135d and 135f of fixture 134 until the tips of the fibers were in funnel 139.
5. Fiber 47/52 was fabricated in a manner similar to that illustrated in FIG. 21 and described in step 3. Coating was removed from the end of about 1 meter of dummy fiber so that the length of the stripped portion is about equal to ½ the length of tube 137. A piece of standard fiber about equal in length to the stripped section of dummy fiber is fused to the end of the bare dummy fiber. The resultant composite fiber is similar to that described in step 3 except that the positions of coreless and standard fiber are reversed. The length of coated coreless fiber was kept as short as possible (typically 15 cm), but it was sufficiently long to be easily handled.
6. The resultant composite fiber is inserted through tube 135b of fixture 134 until its tip is in funnel 139.
7. Fibers 45 and 50 are formed by stripping coating from the ends of two 15 cm lengths of coated dummy fibers. The stripped lengths are slightly less than the length of tube 137.
8. These fibers are inserted through tubes 135e and 135g of fixture 134 until the tips of the fibers are in funnel 139.
9. The five fibers with tips in funnel 139 (see steps 4, 6 and 8) are grasped at a point to the left of the alignment tube fixture and simultaneously fed into bore 138, until their coatings are in funnel 139.
10. A UV light curable epoxy is then employed to tack the fibers to end 141 and/or to funnel 139 of tube 137. Care was taken leave an opening so that bore 138 could be evacuated through funnel 139. The epoxy was UV cured.

The resultant coupler preform was removed from the clamp and its ends were inserted into the chucks of the above-described draw apparatus where the coupler preform was drawn or stretched to form two tapers as described above. The flows of gas and oxygen to the burner were 0.41 and 0.82 standard liters per minute (slpm), respectively. The velocity of each stage was 1.0 cm/second during the stretching of both coupling regions. Each stage stretched the coupler preform 1.17 cm during the formation of the first coupling region, and each stage stretched the preform 1.04 cm during the formation of the second coupling region.

After the device had cooled, the vacuum lines were removed, and drops of UV curable adhesive were applied from a syringe to the ends of the device. It was then removed from the draw. Unused short leads were broken off after the glue was cured. The overall length of the resultant device, including the adhesive drops, was 87 mm.

The first stage WDM coupler was approximately a 1280 nm/1550 nm WDM coupler, i.e. the center wavelengths of the bands of wavelengths appearing at the first and second output terminals were approximately 1280 nm and 1550 nm, respectively.

The second stage WDM couplers were centered at slightly different wavelengths (around 1310 nm and 1580 nm), and the device output is the result of the concatination of the first and second stages. A plot of the spectral insertion loss is shown in FIG. 22. As expected, the 20 dB isolation widths are around 100 nm for both windows. The 30 dB isolation widths are around 60 nm. These results show that broader band or higher isolation specifications (as compared to a single coupler) can be met with a single, monolithic device.

EXAMPLE 2

In addition to standard active fibers and dummy fibers, modified active fibers were used in this example.

The achromatic 2×4 splitter of this example consists of two stages. Reference is made to FIGS. 5 and 6 in connection with fiber positioning. The first stage is a 3-fiber 2×2 achromatic coupler wherein two standard active fibers are separated by a modified active fiber, the cladding of which was doped with approximately 0.11 wt. % chlorine. The second stage consists of two 2-fiber achromatic couplers, each of which is formed of one standard fiber and one modified active fiber, the cladding of which is doped with about 0.19 wt. % chlorine. Thus, fibers 46 and 48 were standard fibers, fiber section 47 was a modified active fiber having 0.11 wt. % chlorine in its cladding, and fiber sections 53 and 54 were modified active fibers having 0.19 wt. % chlorine in their claddings.

The fibers were inserted through fixture 134 and into the tube bore to form a coupler preform as described in Example 1. Composite fibers were formed by fusing dummy and active fibers.

The coupler draw process was similar to that described in Example 1. The ends of the coupler preform were inserted into chucks, and the coupler preform was drawn to form two tapers. The flows of gas and oxygen to the burner were 0.40 and 0.80 slpm, respectively. The velocity of each stage was 1.2 cm/second during the stretching of both coupling regions. Each stage stretched the coupler preform 0.84 cm during the formation of the first coupling region, and each stage stretched the preform 0.68 cm during the formation of the second coupling region. As was done in Example 1, the first stage coupler was measured after its fabrication.

After the device cooled, the vacuum lines were removed, adhesive was applied to its ends, and it was removed from the draw apparatus. The overall length of the resultant device, including the adhesive drops, was 72 mm.

Figure 23:
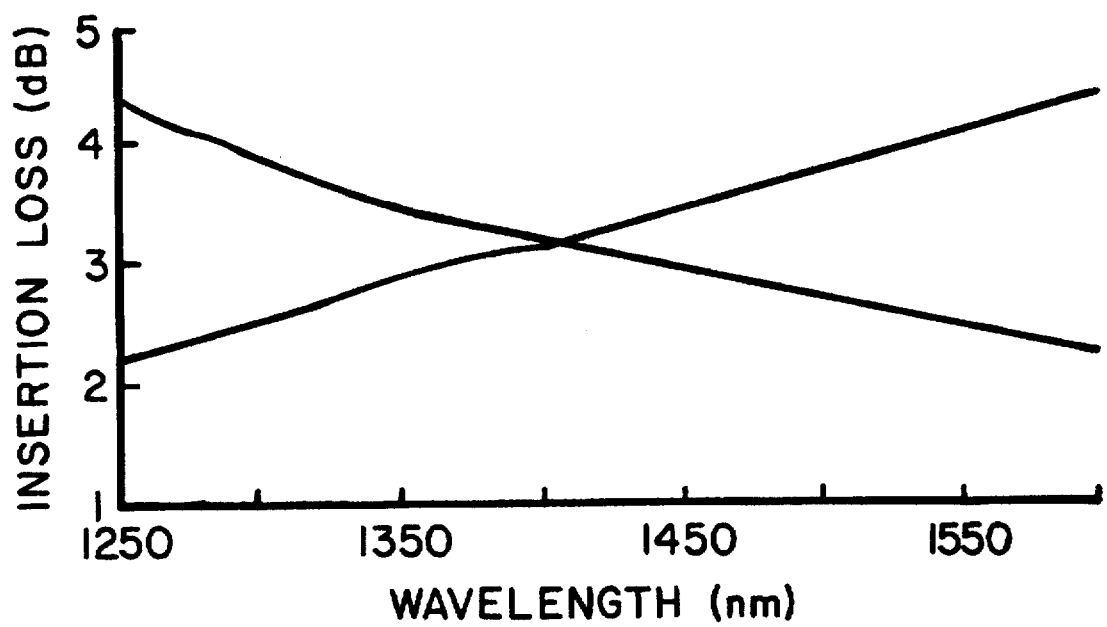
FIG. 23 is a plot of insertion loss vs. wavelength for the first stage of the coupler of Example 2.
Figure 24:
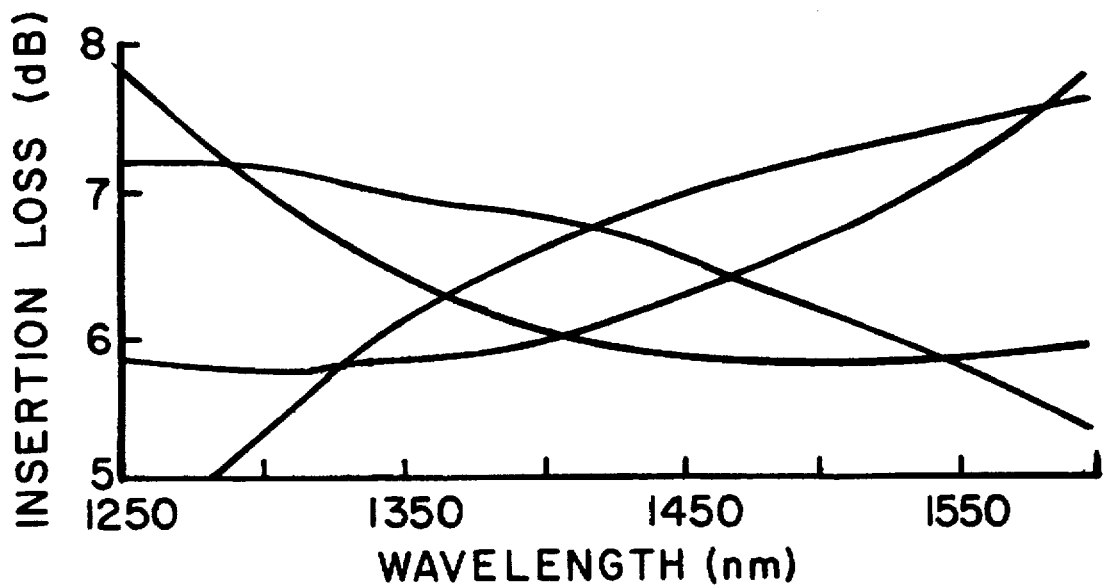
FIG. 24 is a plot of insertion loss vs. wavelength for the 2×4 coupler of Example 2.

Plots of insertion loss vs. wavelength for the first and second stages are shown in FIGS. 23 and 24, respectively. The insertion loss of the first stage, shown in FIG. 23, is significantly more achromatic than can be obtained by forming a coupler with matched fibers and a single tapered region, but it is not as achromatic as theoretically predicted. Performance could be optimized by performing additional work. The first stage is also not as achromatic as the 2-fiber designs discussed in U.S. Pat. No. 5,011,251 (and used in the second stage), but the 3-fiber approach is required in the first stage to eliminate interferometric effects.

The couplers in the second stage are close to optimal 2-fiber achromats yielding net 2×4 coupler performance of less than 7.8 dB insertion loss from 1260 nm to 1580 nm as shown in FIG. 24. Further improvements to the first stage should lower the overall insertion loss by as much as 0.5 dB.

If the composite fibers (the combined active and dummy fibers were not fused together in Examples 1 and 2, a second stuffing fixture, located at the other end of tube 137, would be needed. The procedure would be similar, except that the two through fibers would have to be inserted through one fixture, the tube bore, and then the other fixture, and then fibers with stripped regions of about ½ length of the cane would be inserted through the fixtures at each end.

An approach similar to that discussed above can be used to make fused biconic tapered couplers having two or more coupling regions. Combinations of active fibers, dummy fibers and composite active/dummy fibers would be employed as needed. A fiber insertion fixture similar to that shown in FIG. 19 could be employed. Typically the fiber insertion fixture would be such that it could impart a twist to the fibers to ensure that they are in close physical proximity in the coupling region.

I/we claim:

1. A fiber optic coupling device comprising
    a plurality of N fibers extending in a parallel array, wherein N≧3,
    at least two coupling regions along the length of said array where the cross-sectional area of said fibers is smaller than the cross-sectional area of said fibers at the first and second ends of said array,
    wherein said N fibers and said coupling regions are formed such that light which had been propagating in one of said fibers into a first of said coupling regions, and has separated in said first of said coupling regions so that it propagates in at least two of said fibers from said first of said coupling regions into a second of said coupling regions, does not interfere in the second of said coupling regions.
2. The fiber optic coupling device of claim 1 wherein at least one of said fibers is formed of an active fiber section and a dummy fiber section situated end-to-end, said active fiber section having a light transmitting core surrounded by a cladding having a refractive index lower than that of said core, said dummy fiber section having no light transmitting core.
3. The fiber optic coupling device of claim 2 wherein said fibers are arranged in a given cross-sectional configuration in said first coupling region, and said fibers are arranged in said given cross-sectional configuration in said second coupling region.
4. The fiber optic coupling device of claim 3 wherein N−1 of said fibers are arranged in a circularly symmetric array around a central fiber.
5. The fiber optic coupling device of claim 3 wherein said fibers are arranged in a linear array.
6. The fiber optic coupling device of claim 3 wherein said fibers are arranged such that said given cross-sectional configuration is triangular.
7. The fiber optic coupling device of claim 2 wherein at least two of said fibers contain cores throughout their entire lengths.
8. The fiber optic coupling device of claim 2 further comprising an elongated body of matrix glass through which said fibers extend, the refractive index of said matrix glass being lower than or equal to that of the claddings of said fibers, said body having first and second ends, the cross-sectional area of said body being smaller at said coupling regions than at said first and second ends.
9. The fiber optic coupling device of claim 2 wherein one of said coupler regions contains at least three active fiber sections, a first of said active fiber sections coupling to a second of said active fiber sections through a third of said active fiber sections.
10. The fiber optic coupling device of claim 1 wherein at least one of said fibers is formed of an active fiber section and a dummy fiber section that are situated in end-to-end butting relationship, said active fiber section having a light transmitting core surrounded by a cladding having a refractive index lower than that of said core, said dummy fiber section having no light transmitting core.
11. The fiber optic coupling device of claim 10 wherein at least one of the fiber sections that are situated in end-to-end butting relationship is provided with a low reflection termination.
12. The fiber optic coupling device of claim 1 wherein at least one of said fibers is formed of an active fiber section and a dummy fiber section fused end-to-end, said active fiber section having a light transmitting core surrounded by a cladding having a refractive index lower than that of said core, said dummy fiber section having no light transmitting core.
13. A fiber optic coupling device comprising
    an elongated body of matrix glass, said body having first and second ends,
    a plurality of fibers extending longitudinally within said body,
    at least two coupling regions along the length of said body where the cross-sectional area of said body and the cross-sectional area of the fibers therein are smaller than the cross-sectional area of said fibers and said body at said first and second ends,
    at least one of said fibers being formed of an fiber section and a dummy fiber section situated end-to-end, said active fiber section having a light transmitting core surrounded by a cladding having a refractive index lower than that of said core, said dummy fiber section having no light transmitting core.
14. The fiber optic coupling device of claim 13 wherein said fibers are arranged in a given cross-sectional configuration in said first coupling region, and said fibers are arranged in said given cross-sectional configuration in said second coupling region.

15. A fiber optic coupling device comprising a plurality of N fibers extending in a parallel array, wherein $N \geq 3$, at least a first coupling region and a second coupling region along the length of said array where the cross-sectional area of said fibers is smaller than the cross-sectional area of said fibers at the first and second ends of said array, at least a first and a second of said fibers being active fibers throughout their lengths, said first and second fibers having a light transmitting core surrounded by a cladding having a refractive index lower than that of said core, said first and second fibers coupling to one another in said first coupling region, said first and second fibers remaining uncoupled to one another in said second coupling region, said first fiber being coupled to a third of said fibers in said second coupling region.

16. The fiber optic coupling device of claim 15 further comprising an elongated body of matrix glass through which said fibers extend, the refractive index of said matrix glass being lower than or equal to that of the claddings of said fibers, said body having first and second ends, the cross-sectional area of said body being smaller at said coupling regions than at said first and second ends.

17. A fiber optic coupling device comprising a plurality of N fibers extending in a parallel array, wherein $N \geq 3$, at least two coupling regions along the length of said array where the cross-sectional area of said fibers is smaller than the cross-sectional area of said fibers at the first and second ends of said array, one of said coupling regions having a three-fiber coupling array wherein light is coupled from a first of said plurality of fibers, through a second of said plurality of fibers to a third of said plurality of fibers.

* * * * *